(12) United States Patent
Wood et al.

(10) Patent No.: US 10,428,979 B2
(45) Date of Patent: Oct. 1, 2019

(54) METHOD OF PRODUCING A COMPOSITE PIPE AND SUCH A COMPOSITE PIPE

(71) Applicant: Victrex Manufacturing Limited, Thornton Cleveleys, Lancashire (GB)

(72) Inventors: Alan Wood, Penrith (GB); Horst Sandner, Waldems (DE)

(73) Assignee: VICTREX MANUFACTURING LIMITED, Thornton Cleveleys, Lancashire (GB)

( * ) Notice: Subject to any disclaimer, the term of this patent is extended or adjusted under 35 U.S.C. 154(b) by 506 days.

(21) Appl. No.: 14/884,535

(22) Filed: Oct. 15, 2015

(65) Prior Publication Data

US 2016/0033058 A1 Feb. 4, 2016

Related U.S. Application Data

(62) Division of application No. 13/636,920, filed as application No. PCT/GB2011/050532 on Mar. 17, 2011, now Pat. No. 9,249,903.

(30) Foreign Application Priority Data

Mar. 25, 2010 (GB) .................................. 1005035.9

(51) Int. Cl.
 *B29C 47/90* (2006.01)
 *B29C 71/00* (2006.01)
 (Continued)

(52) U.S. Cl.
 CPC ................ *F16L 9/14* (2013.01); *B29C 48/09* (2019.02); *B29C 48/10* (2019.02);
 (Continued)

(58) Field of Classification Search
 CPC ................................... F16L 9/12; F16L 9/133
 See application file for complete search history.

(56) References Cited

U.S. PATENT DOCUMENTS

H1261 H * 12/1993 Gibson et al. ................ 156/169
5,381,511 A 1/1995 Bahar et al.
(Continued)

FOREIGN PATENT DOCUMENTS

EP 1813292 A1 8/2007
JP 2059330 A 2/1990
(Continued)

OTHER PUBLICATIONS

Talbott, M, et al, "The Effects of Crystallinity on the Mechanical Properties of PEEK Polymer and Graphite Fiber Reinforced PEEK", Journal of COmposite Materials, vol. 21, Nov. 1987, pp. 1056-1081.*

(Continued)

*Primary Examiner* — Jeffry H Aftergut
(74) *Attorney, Agent, or Firm* — Coats & Bennett, PLLC (57) ABSTRACT

A composite pipe comprises a polyetheretherketone innermost pipe around which a reinforcing overwrap is arranged. A protective sheath surrounds the overwrap. Such a composite pipe may be made by selecting a polyetheretherketone pipe having an outer region having a crystallinity of less than 25%; overlaying the selected pipe with overwrap; and subjecting the combination to heat, thereby causing the crystallinity of the outer region of the polyetheretherketone pipe to increase. The method reduces the risk of pipe failure.

14 Claims, 4 Drawing Sheets

(51) Int. Cl.

| | | |
|---|---|---|
| *F16L 9/128* | (2006.01) | |
| *F16L 9/133* | (2006.01) | |
| *F16L 9/14* | (2006.01) | |
| *B29C 48/09* | (2019.01) | |
| *B29C 48/10* | (2019.01) | |
| *B32B 1/08* | (2006.01) | |
| *B32B 27/28* | (2006.01) | |
| *F16L 9/12* | (2006.01) | |
| *F16L 11/08* | (2006.01) | |
| *B32B 5/02* | (2006.01) | |
| *B32B 27/12* | (2006.01) | |
| *B29C 48/90* | (2019.01) | |
| *B29C 63/10* | (2006.01) | |
| *B29C 71/02* | (2006.01) | |
| *B29K 71/00* | (2006.01) | |
| *B29K 81/00* | (2006.01) | |
| *B29L 23/00* | (2006.01) | |
| *B29C 48/88* | (2019.01) | |

(52) U.S. Cl.
CPC ............ *B29C 71/0063* (2013.01); *B32B 1/08* (2013.01); *B32B 5/02* (2013.01); *B32B 27/12* (2013.01); *B32B 27/285* (2013.01); *B32B 27/288* (2013.01); *F16L 9/121* (2013.01); *F16L 9/133* (2013.01); *F16L 11/081* (2013.01); *F16L 11/085* (2013.01); *B29C 48/903* (2019.02); *B29C 48/905* (2019.02); *B29C 48/913* (2019.02); *B29C 48/919* (2019.02); *B29C 63/10* (2013.01); *B29C 2071/022* (2013.01); *B29C 2791/006* (2013.01); *B29K 2071/00* (2013.01); *B29K 2081/00* (2013.01); *B29K 2995/0041* (2013.01); *B29L 2023/22* (2013.01); *B32B 2260/021* (2013.01); *B32B 2260/046* (2013.01); *B32B 2262/0269* (2013.01); *B32B 2262/101* (2013.01); *B32B 2262/106* (2013.01); *B32B 2307/50* (2013.01); *B32B 2307/546* (2013.01); *B32B 2307/552* (2013.01); *B32B 2597/00* (2013.01); *Y10T 156/10* (2015.01)

(56) References Cited

U.S. PATENT DOCUMENTS

| | | | |
|---|---|---|---|
| 6,538,198 B1 | 3/2003 | Wooters | |
| 6,761,574 B1 | 7/2004 | Song et al. | |
| 8,813,332 B2 | 8/2014 | Leibfried et al. | |
| 2002/0007970 A1 | 1/2002 | Terry et al. | |
| 2006/0110560 A1* | 5/2006 | Hussain | G01F 1/8404 |
| | | | 428/36.91 |
| 2008/0196900 A1* | 8/2008 | Leibfried | E21B 36/003 |
| | | | 166/380 |
| 2010/0071794 A1* | 3/2010 | Homan | E21B 47/01 |
| | | | 138/125 |
| 2010/0218839 A1 | 9/2010 | Conley et al. | |
| 2011/0281052 A1* | 11/2011 | Dewhirst | B29C 53/8075 |
| | | | 428/36.9 |

FOREIGN PATENT DOCUMENTS

| | | |
|---|---|---|
| JP | H0752246 A | 2/1995 |
| JP | H07290616 A | 11/1995 |
| WO | 9967561 A1 | 12/1999 |
| WO | 2006059220 A2 | 6/2006 |
| WO | 2006071362 A2 | 7/2006 |
| WO | 2007023255 A1 | 3/2007 |
| WO | 2008125807 A1 | 10/2008 |

OTHER PUBLICATIONS

Sonmez, F, et al, "Modeling of Heat Transfer and Crystallization in Thermoplastic Composite Tape Placement Process", Journal of Thermoplastic COmposite Materials, vol. 10, May 1997, pp. 198-240.*

Sinmazçelik, T. & Yilmaz, T. "Thermal aging effects on mechanical and tribological performance of PEEK and short fiber reinforced PEEK composites". Materials and Design 28 (2007), pp. 641-648. Elsevier, Amsterdam, NL.

Giants, T. W. "Crystallinity and dielectric properties of PEEK, a Thermoplastic Poly(ether ether ketone)". Aerospace Report No. TR-93(3935)-10, pp. 1-29. May 1, 1993, The Aerospace Corporation, El Segundo, CA.

Kampert, W. G. & Sauer, B. B. "Temperature Modulated DSC Studies of Melting and Recrystallization in Poly (oxy-1,4-phenyleneoxy-1,4-phenylenecarbonyl-1,4-phenylene) (PEEK)". Polymer Engineering and Science, vol. 41, No. 10, Oct. 1, 2001, pp. 1714-1730. Wiley, Hoboken, NJ.

* cited by examiner

METHOD OF PRODUCING A COMPOSITE PIPE AND SUCH A COMPOSITE PIPE

CROSS-REFERENCE TO RELATED APPLICATIONS

The present application is a divisional of U.S. application Ser. No. 13/636,920, which is the national stage entry under 35 U.S.C. 371 of international application no. PCT/GB2011/050532, filed Mar. 17, 2011, which in turn claims priority to foreign application no. GB1005035.9, filed Mar. 25, 2010, each of which applications are incorporated herein by reference in their entirety.

This invention relates to a pipe and particularly, although not exclusively, relates to a method of producing a composite pipe and such a pipe per se. Embodiments aim to extend the lifetime and/or reduce the risk of premature failure of a pipe which may carry a high pressure fluid (e.g. liquid (optionally containing particulates), gas or a mixture of the two) and/or be subjected to high external forces, in use. Preferred embodiments relate to pipes for use in the oil and/or gas industries for example flexible risers arranged to transport fluids between floating production units and a sub-sea wellhead.

Composite umbilicals and other composite pipes for use in the recovery of hydrocarbons from oil or gas wells or for use in performing downhole operations are well-known, for example from US2002/0007970, U.S. Pat. No. 6,761,574, WO2006/071362, U.S. Pat. No. 6,538,198, WO99/67561 and WO2006/059220.

In general terms, a composite pipe may comprise an inner pipe which may be arranged to carry pressurized oil, gas or other fluids (e.g. mixtures of liquids and gases), surrounded by a reinforcing means. In some cases, for example in umbilical tubes/pipes the pressure within the composite pipe may be as high as 30000 psi; in other cases, for example in risers for transporting oil/gas upwards from a subterranean formation, the pressure, whilst still appreciable, may be less than 8000 psi.

Known inner pipes of composite pipes may comprise a polymeric material, for example a polyamide, polyvinylidene fluoride, fluoroethylene-propylene, other fluoropolymers or polyetheretherketone. The inner pipe needs to be thermally and chemically resistant and robust under the conditions of temperature and pressure to which it may be subjected by fluid flowing through it in use. The reinforcing means may comprise one or more layers around the inner pipe which are arranged to resist expansion of the inner pipe due to the pressure of fluid flowing therewithin, and to protect the inner pipe from external pressure and mechanical and thermal loads to which the pipe may be exposed in use. The reinforcing means may comprise a reinforcing tape which is wound around the inner tube and optionally glued or welded thereto. The reinforcing tape may comprise fibrous material, such as carbon, glass or aramid fibres, embedded in a thermoplastic or thermosetting resin such as a polyamide, polysulphone, polyetherimide, polyethersulphone or polyetheretherketone.

It is of course desirable for composite pipes to have the maximum possible useful lifetimes. However, composite pipes may be manufactured with high internal stress (for example due to the pipes having significantly different levels of crystallinity across their wall thickness) which may lead to premature failure of the pipes, in use. For example, when a composite pipe comprises an inner pipe around which is wound a tape which is not bonded to the inner pipe, there may be a small amount of play between the inner pipe and tape. In use, when the inner pipe transports a pressure fluid, the inner pipe may expand slightly and then contract as the pressure of the fluid reduces and/or flow of fluid is periodically stopped. This expansion and contraction of the inner pipe may cause fatigue in the inner pipe and cause it to fail for example by cracking or otherwise being rendered less effective. Composite pipes which comprise tape welded to the inner pipe may also be inherently stressed such that, when such a composite pipe is subjected to pressure and/or movement (e.g. flexing or tension caused by the force of the sea) such force may become concentrated in certain stressed regions and, consequently, the composite pipe may fail in such regions prematurely.

It is an object of the present invention to address the aforementioned problems.

It is an object of a preferred embodiment of the present invention to provide a composite pipe with reduced internal stress.

According to a first aspect of the invention, there is provided a method of producing a composite pipe which comprises:

(i) selecting a pipe P1 having an outer region comprising a crystalline or crystallisable polymeric material having a crystallinity of less than 25%, wherein said polymeric material includes:
  (a) phenyl moieties:
  (b) ether and/or thioether moieties; and, optionally,
  (c) ketone and/or sulphone moieties;
(ii) overlaying the selected pipe P1 with a reinforcing means and causing the crystallinity of the outer region of pipe P1 to increase, thereby to define the composite pipe.

FTIR may be used to assess crystallinity and this may be used to assess the level of crystallinity at a surface and/or across the thickness of a sample. Reference is made to a paper titled "Crystallinity in Poly(Aryl-Ether-Ketone) Plaques Studied by Multiple Internal Reflection Spectroscopy" (Polymer Bull, 11, 433 (1984)).

Said crystallinity of the outer region in step (i) may be less than 21%, is suitably less than 18% and, preferably, is less than 15%. In some cases, said crystallinity may be less than 14%, 13%, 12%, 11% or 10%. The crystallinity may be greater than 5%, 6% or 7%. Suitably, the crystallinity of the outer region may be assessed by measuring the crystallinity of an outer surface of pipe P1, for example by FTIR as described.

Said pipe P1 suitably has a substantially circular cross-section. Said outer region is preferably defined by a substantially annular cross-section region. Said pipe suitably includes an annular wall, wherein said outer region comprises an annular region defining the periphery of the annular wall. Said outer region having said crystallinity referred to preferably extends across at least 90% of the area of the periphery of the annular wall. Said outer region having said crystallinity preferably extends substantially along the entire extent of said pipe. Thus, preferably, substantially the entirety of the periphery of the pipe, for example, the entirety of a circularly cylindrical surface of the pipe, has said crystallinity. Thus, suitably, the crystallinity may be assessed using the FTIR method described, at any position on a radially outwardly facing surface of the pipe P1.

Said pipe P1 may have an outside diameter of at least 2.5 cm, suitably at least 7 cm, preferably at least 10 cm, more preferably at least 15 cm. The diameter may be less than 50 cm, preferably less than 40 cm, more preferably less than 30 cm.

The thickness of the wall which defines the pipe P1 may be at least 0.5 mm, suitably at least 0.8 mm, preferably 1 mm or more. The thickness may be less than 30 mm, suitably less than 15 mm, preferably less than 10 mm, more preferably less than 8 mm, especially less than 6 mm. The thickness is preferably in the range 1 mm to 5 mm.

In some cases, however, the outside diameter may be up to about 100 cm, especially where relatively short pipe lengths are provided.

Said outer region may have a thickness of at least 50 μm or at least 100 μm. It may be 250 μm or less. The thickness is suitably dependent on the cooling regime, for example the coolant temperature and time of contact with coolant. Typically, it may be about 250 μm where the coolant is cold water and the immersion time is such as to bring about a sufficient reduction in temperature whilst ensuring any residual heat does not lead to annealing of the outer region.

The ratio of the thickness of the outer region to the thickness of the annular wall which defines pipe P1 may be in the range 0.01 to 0.2, for example in the range 0.025 to 0.1.

An inside surface of the pipe (e.g. a radially inwardly facing surface) which is suitably defined by an inwardly facing surface of the annular wall, preferably has a crystallinity which is greater than the crystallinity of said outer region, suitably by at least 2%. The crystallinity of said inwardly facing surface may be at least 4%, suitably at least 6%, preferably at least 8%, more preferably at least 10% more than the crystallinity of the outer region of pipe P1 selected in step (i) of the method. The crystallinity of said inwardly facing surface may be at least 25%, or at least 27%, or at least 30%. The ratio of the crystallinity of the outer region, for example an outer surface of pipe P1, to the crystallinity of said inside surface of pipe P1 may be in the range 0.2 to 0.8.

Figure 4:
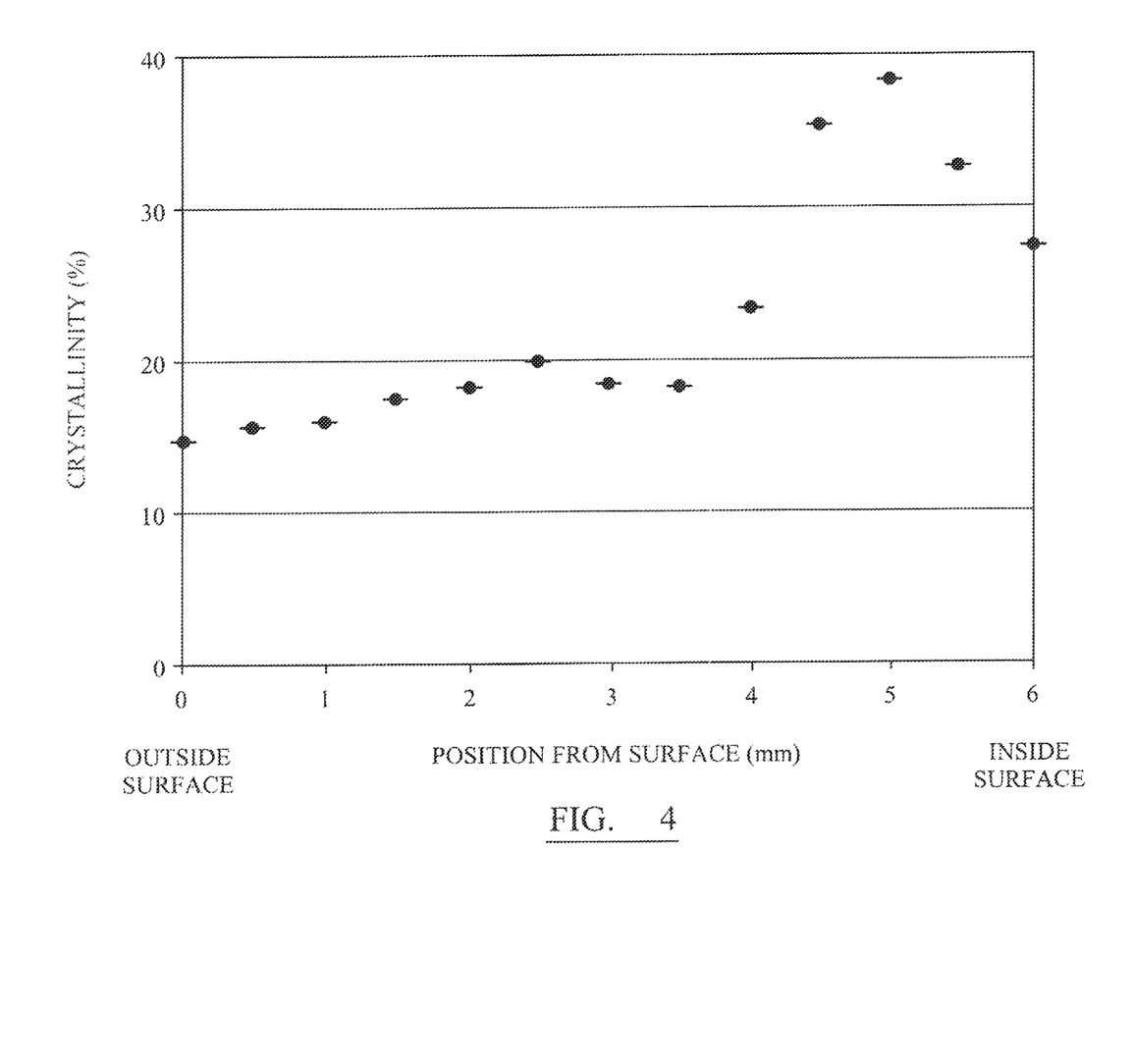
FIG. 4 is a plot of % crystallinity v. distance from surface for the PEEK pipe of FIG. 3.

The crystallinity of the inside surface of pipe P1 may not be the maximum crystallinity of a region of the pipe. In this regard, as illustrated in FIG. 4 hereinafter, the maximum crystallinity may be found slightly radially outwardly of said inside surface. Thus, the maximum crystallinity in a region of said pipe P1, suitably measured by FTIR, is suitably greater than the crystallinity of said outer region, suitably by at least 2%. The maximum crystallinity may be at least 4%, suitably at least 6%, preferably at least 8%, more preferably at least 10% more than the crystallinity of the outer region of pipe P1 selected in step (i) of the method. The maximum crystallinity may be at least 25%, 27% or 29%. In some cases, it could be as high as 35%. The ratio of the crystallinity of the outer region, for example an outer surface of pipe P1, to the maximum crystallinity of pipe P1 may be in the range 0.2 to 0.8.

Said pipe P1 preferably comprises, more preferably consists essentially of, a single said polymeric material or a single homogenous polymeric composition comprising said polymeric material. Thus, said pipe P1 is preferably substantially homogenous except that it comprises a polymeric material having different levels of crystallinity between its inner and outer surfaces, for example between the outer region and an inside surface of the pipe.

Said polymeric material is suitably semi-crystalline and may be such that the kinetics of crystallisation are so fast that it is substantially impossible to produce a solid from the polymeric material which is fully amorphous. For example, the crystallinity half-life ($t_{0.5}$) of the polymeric material at 15° C. above its Tg may be less than 1000 seconds, less than 500 seconds, less than 250 seconds, or less than 150 seconds determined in accordance with the description in J. Brandrup, E. H. Immergut and E. A. Grulke, *Polymer Handbook 4th Edition, Wiley Interscience,* 1999, ISBN 0-471-47936-5 (Vol 1) and 0-471-48172-6 (Vol 2).

On the aforementioned basis the $t_{0.5}$ for polyetheretherketone at 160° C. (which is close to 15° C. above its Tg) is 126 seconds which indicates that crystallisation occurs very rapidly.

Said polymeric material suitably has a Tg of greater than 50° C., preferably greater than 75° C., more preferably greater than 85° C. or greater than 100° C. Said polymeric material may have a Tg of less than 260° C., for example less than 220° C. or less than 200° C. In some cases, the Tg may be less than 190° C., 180° C. or 170° C. Said, polymeric material preferably has a Tg of greater than 50° C., more preferably greater than 80° C., especially greater than 120° C.

Said polymeric material suitably has a melt viscosity (MV) of at least 0.06 $kNsm^{-2}$, preferably has a MV of at least 0.08 $kNsm^{-2}$, more preferably at least 0.085 $kNsm^{-2}$, especially at least 0.09 $kNsm^{-2}$. MV is suitably measured using capillary rheometry operating at 400° C. at a shear rate of $1000s^{-1}$ using a tungsten carbide die, 0.5×3.175 mm. Said polymeric material may have a MV of less than 1.00 $kNsm^{-2}$, suitably less than 0.5 $kNsm^{-2}$.

Said polymeric material may have a tensile strength, measured in accordance with ASTM D790 of at least 40 MPa, preferably at least 60 MPa, more preferably at least 80 MPa. The tensile strength is preferably in the range 80-110 MPa, more preferably in the range 80-100 MPa.

Said polymeric material may have a flexural strength, measured in accordance with ASTM D790 of at least 145 MPa. The flexural strength is preferably in the range 145-180 MPa, more preferably in the range 145-165 MPa.

Said polymeric material may have a flexural modulus, measured in accordance with ASTM D790, of at least 2 GPa, preferably at least 3 GPa, more preferably at least 3.5 GPa. The flexural modulus is preferably in the range 3.5-4.5 GPa, more preferably in the range 3.5-4.1 GPa.

Preferably, said polymeric material has a moiety of formula

I and/or a moiety of formula

II and/or a moiety of formula

III wherein m, r, s, t, v, w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)**, (i) to (iv) which is bonded via one or more of its phenyl moieties to adjacent moieties Unless otherwise stated in this specification, a phenyl moiety has 1,4-, linkages to moieties to which it is bonded.

In (i), the middle phenyl may be 1,4- or 1,3-substituted. It is preferably 1,4-substituted.

to one another—that is, with no other atoms or groups being bonded between units I, II and III.

Phenyl moieties in units I, II and III are preferably not substituted. Said phenyl moieties are preferably not cross-linked.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the polymeric material does not include a —S— moiety. Preferably, G represents a direct link.

Suitably, "a" represents the mole % of units of formula I in said polymeric material, suitably wherein each unit I is the same; "b" represents the mole % of units of formula II in said polymeric material, suitably wherein each unit II is the same; and "c" represents the mole % of units of formula III in said polymeric material, suitably wherein each unit III is the same. Preferably, a is in the range 45-100, more preferably in the range 45-55, especially in the range 48-52. Preferably, the sum of b and c is in the range 0-55, more preferably in the range 45-55, especially in the range 48-52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Suitably b is at least 20, preferably at least 40, more preferably at least 45. Preferably, a is 20 or less, preferably 10 or less, more preferably 5 or less. Preferably, said polymeric material consists essentially of moieties I, II and/or III.

Said polymeric material may be a homopolymer having a repeat unit of general formula or a homopolymer having a repeat unit of general formula In one embodiment, a polymeric material may comprise a repeat unit of formula I and no other repeat units. Said polymeric material may be polyphenylenesulphide (PPS).

In a preferred embodiment, said polymeric material may include more than one different type of repeat unit of formula I; and more than one different type of repeat unit of formula II; and more than one different type of repeat unit of formula III. Preferably, however, only one type of repeat unit of formula I, II and/or III is provided.

Said moieties I, II and III are suitably repeat units. In the polymeric material, units I, II and/or III are suitably bonded or a random or block copolymer of at least two different units of IV and/or V
wherein A, B, C and D independently represent 0 or 1 and E, E', G, Ar, m, r, s, t, v, w and z are as described in any statement herein.

Preferably, m is in the range 0-3, more preferably 0-2, especially 0-1. Preferably, r is in the range 0-3, more preferably 0-2, especially 0-1. Preferably t is in the range 0-3, more preferably 0-2, especially 0-1. Preferably, s is 0 or 1. Preferably v is 0 or 1. Preferably, w is 0 or 1. Preferably z is 0 or 1.

Preferably, said polymeric material is a homopolymer having a repeat unit of general formula IV.

Preferably Ar is selected from the following moieties (xi)** and (vii) to (x)

In (vii), the middle phenyl may be 1,4- or 1,3-substituted. It is preferably 1,4-substituted.

Suitable moieties Ar are moieties (i), (ii), (iii) and (iv) and, of these, moieties (i), (ii) and (iv) are preferred. Other preferred moieties Ar are moieties (vii), (viii), (ix) and (x) and, of these, moieties (vii), (viii) and (x) are especially preferred.

Said polymeric material suitably includes at least 60 mole %, preferably at least 70 mole %, more preferably at least 80 mole %, especially at least 90 mole % of repeat units which do not include —S— or —SO2- moieties. Said polymeric material suitably includes at least 60 mole %, preferably at least 70 mole %, more preferably at least 80 mole %, especially at least 90 mole % of repeat units which consist essentially of phenyl moieties, ether moieties and ketone moieties.

An especially preferred class of polymeric materials are polymers (or copolymers) which consist essentially of phenyl moieties in conjunction with ketone and/or ether moieties. That is, in the preferred class, the polymeric material does not include repeat units which include —S—, —SO$_2$— or aromatic groups other than phenyl. Preferred polymeric materials of the type described include:

(a) a polymer consisting essentially of units of formula IV wherein Ar represents moiety (iv), E and E' represent oxygen atoms, m represents 0, w represents 1, G represents a direct link, s represents 0, and A and B represent 1 (i.e. polyetheretherketone).

(b) a polymer consisting essentially of units of formula IV wherein E represents an oxygen atom, E' represents a direct link, Ar represents a moiety of structure (i), m represents 0, A represents 1, B represents 0 (i.e. polyetherketone);

(c) a polymer consisting essentially of units of formula IV wherein E represents an oxygen atom, Ar represents moiety (i), m represents 0, E' represents a direct link, A represents 1, B represents 0, (i.e. polyetherketoneketone).

(d) a polymer consisting essentially of units of formula IV wherein Ar represents moiety (i), E and E' represent oxygen atoms, G represents a direct link, m represents 0, w represents 1, r represents 0, s represents 1 and A and B represent 1, (i.e. polyetherketoneetherketoneketone).

(e) a polymer consisting essentially of units of formula IV, wherein Ar represents moiety (iv), E and E' represents oxygen atoms, G represents a direct link, m represents 0, w represents 0, s, r, A and B represent 1 (i.e. polyetheretherketoneketone).

(f) a polymer comprising units of formula IV, wherein Ar represents moiety (iv), E and E' represent oxygen atoms, m represents 1, w represents 1, A represents 1, B represents 1, r and s represent 0 and G represents a direct link (i.e. polyether-diphenyl-ether-phenyl-ketone-phenyl-).

The main peak of the melting endotherm (Tm) for said polymeric material may be at least 300° C.

Said polymeric material may consist essentially of one of units (a) to (f) defined above.

Said polymeric material preferably comprises, more preferably consists essentially of, a repeat unit of formula (XX)

where t1, and w1 independently represent 0 or 1 and v1 represents 0, 1 or 2. Preferred polymeric materials have a said repeat unit wherein t1=1, v1=0 and w1=0; t1=0, v1=0 and w1=0; t1=0, w1=1, v1=2; or t1=0, v1=1 and w1=0. More preferred have t1=1, v1=0 and w1=0; or t1=0, v1=0 and w1=0. The most preferred has t1=1, v1=0 and w1=0.

In preferred embodiments, said polymeric material is selected from polyetheretherketone, polyetherketone, polyetherketoneetherketoneketone and polyetherketoneketone. In a more preferred embodiment, said polymeric material is selected from polyetherketone and polyetheretherketone. In an especially preferred embodiment, said polymeric material is polyetheretherketone.

When said pipe P1 comprises or consists essentially of a polymeric composition, said polymeric composition may include said polymeric material and one or more fillers.

Said polymeric material may make up at least 60 wt %, suitably at least 70 wt %, preferably at least 80 wt %, more preferably at least 90 wt %, especially at least 95 wt %, of the total amount of thermoplastic polymeric materials in said polymeric composition from which said pipe P1 is made.

A single said polymeric material is preferably substantially the only thermoplastic polymer in said polymeric composition. Suitably, a reference to a thermoplastic polymer refers to a polymer which is melted in the formation of said pipe P1.

A filler is suitably a material which is not melted in manufacture of pipe P1. It suitably has a melting temperature of greater than 350° C.

Said filler may include a fibrous filler or a non-fibrous filler. Said filler may include both a fibrous filler and a non-fibrous filler. A said fibrous filler may be continuous or discontinuous. A said fibrous filler may be selected from inorganic fibrous materials, non-melting and high-melting organic fibrous materials, such as aramid fibres, and carbon fibre. A said fibrous filler may be selected from glass fiber, carbon fibre, asbestos fiber, silica fiber, alumina fiber, zirconia fiber, boron nitride fiber, silicon nitride fiber, boron fiber, fluorocarbon resin fibre and potassium titanate fiber. Preferred fibrous fillers are glass fibre and carbon fibre. A fibrous filler may comprise nanofibres.

A said non-fibrous filler may be selected from mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, fluorocarbon resin, graphite, polybenzimidazole (PBI), carbon powder, nanotubes and barium sulfate. The non-fibrous fillers may be introduced in the form of powder or flaky particles.

Preferably, said filler comprises one or more fillers selected from glass fibre, carbon fibre, carbon black and a fluorocarbon resin. More preferably, said filler comprises glass fibre or carbon, especially discontinuous, for example chopped, glass fibre or carbon fibre.

Said polymeric composition suitably includes 35-100 wt %, preferably 50-100 wt %, more preferably 65-100 wt % of said polymeric material.

Said polymeric composition suitably does not include a reinforcing filler (e.g. carbon fibre) but may include a non-reinforcing filler (e.g. talc or carbon black) which may be included to reduce costs. However, such a filler could detrimentally increase the roughness of the inside of the pipe and therefore increase pipe losses in the fluid flowing through it. To address this, the inside of the pipe could be provided (e.g. by coextrusion) with a layer comprising substantially 100 wt % of unfilled polymeric material (e.g. the same polymeric material as in said polymeric composition).

Suitably, the total amount of filler in said polymeric composition is 65 wt % or less, or 60 wt % or less. Said polymeric composition may include 0-65 wt %, preferably 0-50 wt %, more preferably 0-35 wt % of filler. Preferably, said polymeric composition includes less than 5 wt % and, more preferably, includes substantially no filler means.

Preferably, said pipe P1 consists essentially of a polymeric material of formula (XX) and, especially, consists essentially of polyetheretherketone.

Said reinforcing means is preferably arranged around substantially the entire outer region and/or outer periphery of pipe P1. It is suitably arranged to resist mechanical and/or thermal loads to which the composite pipe may be exposed in use. For example, it is suitably arranged to prevent compression of pipe P1 due to the weight of water that may act on it in use and/or to resist expansion of pipe P1 due to flow of a hot pressure fluid therethrough in use.

The method may comprise selecting, for use in step (ii) of the method, a reinforcing means comprising a first material and a second material.

Said first material may comprise a thermoplastic or thermosetting resin. Said resin may be of any suitable type, for example a polyamide, polysulphone, polyetherimide, polyethersulphone or any of the polymeric materials comprising (a) phenyl moieties; (b) ketone and/or sulphone moieties; an/or (c) ether and/or thioether moieties described above for pipe P1. Preferably, said first material is selected from homopolymers or copolymers comprising units IV and/or V referred to above. More preferably, said first material is of general formula (XX) as described above. Said first material preferably comprises polyetheretherketone. Preferably, the polymeric material of the outer region of pipe P1 and said first material are polymeric materials with the same repeat units, for example both being homopolymers or copolymers comprising units IV and/or V and/or being of general formula (XX).

Said second material of said reinforcing means preferably comprises a fibrous material. Said fibrous material may independently have any feature of the fibrous filler described above in the context of filler optionally included in pipe P1. Said fibrous material may be continuous or discontinuous. It is preferably selected from glass, aramid or carbon fibres.

Said reinforcing means may include 25-75 wt % (more preferably 35-75 wt %) of said first material and 25-75 wt % (more preferably 25-65 wt %) of said second material.

Said reinforcing means may comprise a substantially homogenous arrangement of said first and second materials.

The reinforcing means selected for step (ii) is preferably flexible and arranged to be wrapped around pipe P1. It may be elongate and it may comprise a tape, mat or woven structure which is arranged to be wound around pipe P1.

The reinforcing means may be heated prior to, during and/or after it has been contacted with the pipe P1 in the method. It may be heated to a temperature such that the first material is above its Tg and/or it softens or preferably melts. It may be heated to a temperature in the range 330° C. to 400° C. It may be heated using any suitable heating means, for example infra-red, laser, gas flame, hot air or hot gas. Preferably, the first material is in a melted state at some stage after contact with pipe P1, suitably so the reinforcing means can bond to pipe P1.

In a first embodiment, said reinforcing means may be extruded as a sheath over the selected pipe P1 in the method. Heat from the extrudate will during and/or after being overlaid on the pipe P1 be transferred to the pipe P1 to cause the crystallinity of the outer region of pipe P1 to increase. The reinforcing means for such an embodiment may comprise a polymer of formula (XX), for example polyetheretherketones, and glass fibres for example 20-40 wt % glass fibres.

In other embodiments, said reinforcing means may be flexible and may be wrapped round the pipe P1. For example, in a second embodiment, the reinforcing means may comprise co-mingled fibres comprising said first and second materials. Said first material, for example of polyetheretherketones, may be in the form of a discontinuous fibre (e.g. relatively short fibres of less than 10 mm) and said second material may comprise continuous fibres, for example of carbon fibre. Such a reinforcing means, suitably in the form of a fabric, may be arranged around pipe P1 and consolidated by heat and/or pressure. During consolidation, said first material may melt and heat may pass from the first material to the pipe P1 to cause the crystallinity of the outer region of the pipe to increase.

In a third embodiment, said reinforcing means may comprise a first material defining a matrix in which a fibrous material is arranged. The matrix suitably comprises a said polymeric material, for example of formula (XX). Said fibrous material may comprise a fibrous material as described herein but is preferably selected from glass, aramid and carbon fibres. The fibrous material may be continuous or discontinuous. Said reinforcing means may comprise a fabric, tape or tow.

Said third embodiment, especially wherein the reinforcing means is in the form of a tape, is especially preferred.

Said reinforcing means may define a reinforcing layer around pipe P1 of a thickness of at least 0.25 mm, at least 0.5 mm or at least 1 mm. The thickness may be in the range 1 mm to 80 mm, for example 1 mm to 50 mm. The reinforcing layer may itself comprise many layers (e.g. greater than 10, 25, 40, 70 or 90 layers) of reinforcing means, for example tape, overlaying one another.

In step (ii) of the method, crystallinity of the outer region of pipe P1 is caused to increase by subjecting the outer region of pipe P1 to heat, suitably so the outer region can re-crystallise, thereby to increase its crystallinity. In a preferred embodiment, in step (ii), at least part of the outer region of the pipe P1 melts. Thus, preferably, in step (ii), the outer region of the pipe P1 is subjected to a temperature above the melting temperature (Tm) of said polymeric material of pipe P1. However, it should be noted that the crystallinity of regions of pipe P1 may increase by being subjected to heat, even though such regions do not melt. This is discussed hereinafter with reference to FIG. 5. Preferably, in step (ii), heat is conducted from the reinforcing means to the outer region of pipe P1. Such conduction of heat suitably causes crystallinity of pipe P1 to increase. Preferably, pipe P1 is not heated by a heating means other than by contact with said reinforcing means or by a heating means used to heat the reinforcing means during or after application of the reinforcing means to the pipe P1.

In step (ii), the crystallinity of an outer surface of pipe P1 may increase by at least 2%, suitably by at least 5%, preferably by at least 8%, more preferably by at least 10%, especially by at least 12%. After step (ii), the difference between the crystallinity of the outer surface of pipe P1 and an inside surface of pipe P1 (preferably between radially spaced apart outside and inside surfaces) is less than 5%, suitably less than 4% or 3%. After step (ii) the outer surface of pipe P1 may have a crystallinity of at least 20% or at least 25%. The inside surface preferably has a crystallinity of at least 20% or at least 25% or at least 27%.

Said method is a method of producing a flexible riser having a length of at least 10 m, suitably at least 50 m, preferably at least 100 m, more preferably at least 500 m, especially at least 1000 m.

The method may involve application of additional layers after step (ii). Such layers may be arranged to protect the reinforcing means.

Preferably, the method is a method of producing a composite pipe which comprises a pipe P2 which is produced from said pipe P1 in the method by increasing the crystallinity of the outer region in step (ii). The composite pipe is described further according to the second aspect.

According to a second aspect of the invention, there is provided a composite pipe comprising a pipe P2 having an outer region comprising a polymeric material having a crystallinity of greater than 25%, said pipe P2 being overlaid with a reinforcing means, wherein said polymeric material includes:
(a) phenyl moieties;
(b) ether and/or thioether moieties and, optionally,
(c) ketone and/or sulphone moieties.

The composite pipe of the second aspect may have any feature of the composite pipe produced in the method of the first aspect. In this case pipe P2 represents pipe P1 after its crystallinity has been increased in step (ii) of the method.

A preferred composite pipe has a length of at least 10 m, suitably at least 50 m, preferably at least 100 m, more preferably at least 500 m, especially at least 1000 m. A preferred pipe comprises a pipe P2 comprising, preferably consisting essentially of, a polymeric material of formula (XX), especially polyetheretherketone, having an inside surface having a crystallinity of at least 20%, preferably at least 25%; and an outside surface having a crystallinity of at least 20%, preferably at least 25%. The pipe P2 is suitably overlaid with a reinforcing means which comprises a polymeric material of formula (XX), especially polyetheretherketone. The reinforcing means preferably includes fibres, for example carbon fibre, glass fibre or aramid fibre. The reinforcing means preferably contacts the pipe P2 and polymeric material of the reinforcing means is preferably fused and/or mingles with polymeric material of pipe P2. Thus, preferably no adhesive or other intermediate material is positioned between pipe P2 and the reinforcing means to secure the reinforcing means and pipe P2 together. A protective layer suitably extends around the reinforcing means.

The composite pipe may have an outside diameter of at least 5 cm, 10 cm, 20 cm, 30 cm or 40 cm. The outside diameter may be less than 100 cm, less than 90 cm, less than 80 cm, less than 70 cm, or less than 60 cm.

The composite pipe is preferably flexible enough to be spooled onto a reel with a hub radius of 4500-8500 mm.

The invention extends to a flexible riser for transporting fluid between a floating production unit and a sub-sea wellhead. The riser may comprise a composite pipe made as described in the first aspect and/or as described in the second aspect. The flexible riser preferably includes means for connection to the sub-sea well head and/or means for connection to the floating production unit.

According to a third aspect of the invention, there is provided a method of transporting fluid between first and second locations, the method comprising positioning a composite pipe as described herein between the locations.

The first location may be sub-surface, for example a sub-sea location. The second location may be above the height of the first location, for example it may be arranged at/or adjacent the surface of the sea and may comprise a floating production unit.

The composite pipe may define a lazy S-shape.

According to a fourth aspect, there is provided an assembly comprising a composite pipe secured between first and second locations, for example between a sub-sea wellhead and a production unit.

The composite pipe may define a lazy S-shape.

The invention extends to the use of a composite pipe as described herein for transporting fluids between first and second locations as described herein.

Any invention described herein may be combined with any feature of any other invention or embodiment described herein mutatis mutandis.

Specific embodiments of the invention will now be described, by way of example, with reference to the accompanying figures in which.

Figure 1:
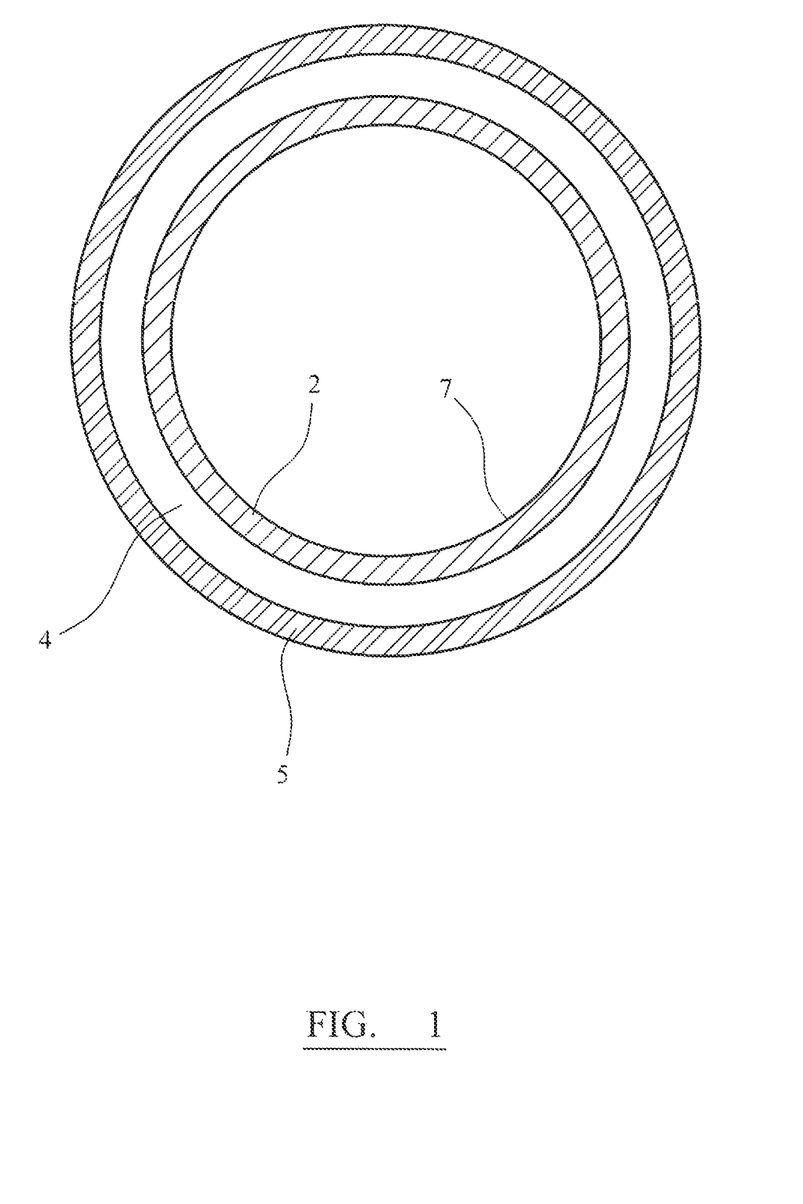
FIG. 1 is a cross-section through a composite pipe.

A composite pipe, shown in FIG. 1, comprises a polyetheretherketone (PEEK) innermost pipe 2 around which a reinforcing overwrap 4 is arranged. A protective sheath 5 surrounds the overwrap 4. The pipe has a substantially constant cross-section along its extent.

The pipe 2 contacts fluids (e.g. oil and/or gas) flowing therewithin in use and must be able to withstand the temperature of such fluids (typically 100-200° C.), be chemically inert to such fluids and resist wear and abrasion so that the pipe 2 can enjoy a long service life. PEEK satisfies the aforementioned requirements. It has high temperature resistance, allowing long term use at a temperature in excess of 200° C. It also has high chemical resistance, high permeation resistance and high erosion/wear resistance. It also can readily be arranged to define a relatively smooth bore 7, which facilitates passage of fluids therethrough. Additionally, the pipe can have high enough strength to enable it to act as a mandrel during application, for example winding, of overwrap 4.

The reinforcing overwrap 4 is arranged to tolerate and/or resist mechanical loads, to which the composite pipe may be exposed in use. For example, the reinforcing overwrap 4 is arranged to resist expansion of the pipe 2 due to the pressure of fluids flowing therewithin; compression of pipe 2 due to external pressure, for example when positioned in deep water; tension from its own hanging weight; and fatigue by action of wave motion or other movement.

The reinforcing overwrap 4 is defined by a flat tape which comprises unidirectional continuous or jointed fibres of carbon, glass and/or aramid embedded in a PEEK matrix which is wrapped around the pipe 2. The fibre volume in the tape is typically 20-70 vol %, with the PEEK matrix providing the remaining 30 to 80 vol %. Suitable tape is available from Ten Cate Advanced Composites USA, Inc. or from Suprem.

The protective sheaf 5 may comprise a relatively cheap polymeric material which has a relatively low melting point such as polyethylene, polyamide (e.g. polyamide 11 or 12) or polyurethane.

Figure 2:
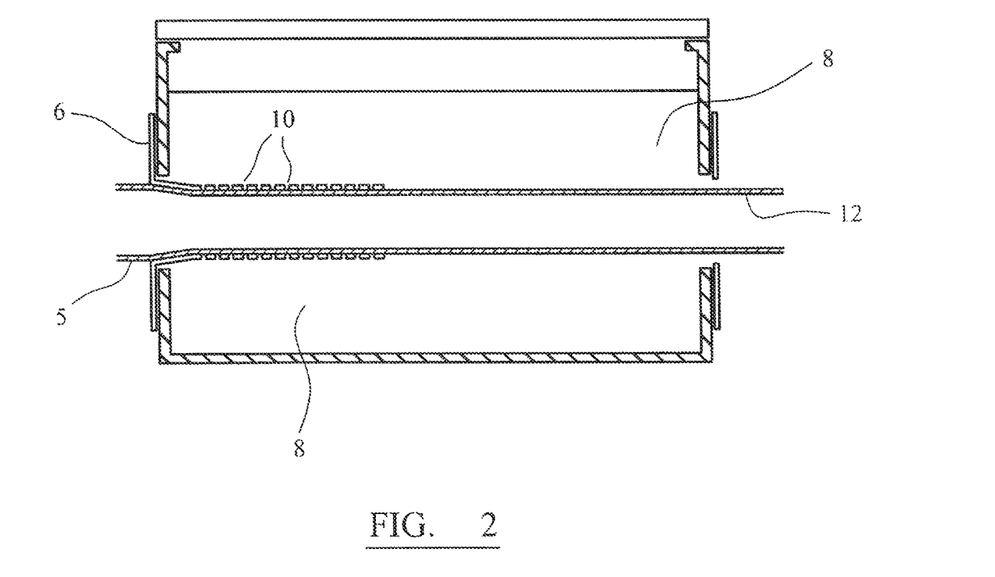
FIG. 2 is a cross-section through an apparatus for producing a polyetheretherketone (PEEK) pipe having an amorphous skin.

The composite pipe may be manufactured as described further below. The innermost pipe 2 is made by extruding an annular section molten tube, followed by cooling and solidification to produce a continuous pipe. Referring to FIG. 2, the cooling process may be carried out by passing the extruded melted PEEK 5 through the centre of a brass sleeve 6, typically of wall thickness 2-3 mm which is immersed within a water bath 8. A vacuum is applied to the interior of the water bath to draw the extrudate out so that it touches the brass sleeve, the resulting heat transfer between extrudate and sleeve leading to solidification of the PEEK. The vacuum may be generated using a liquid-ring-seal type of vacuum pump, an internal water overflow in the tank being the supply to the pump. The brass sleeve 6 has openings 10 which allow air trapped between the extrudate (and forming pipe 12) and the brass sleeve to escape.

Figure 3:
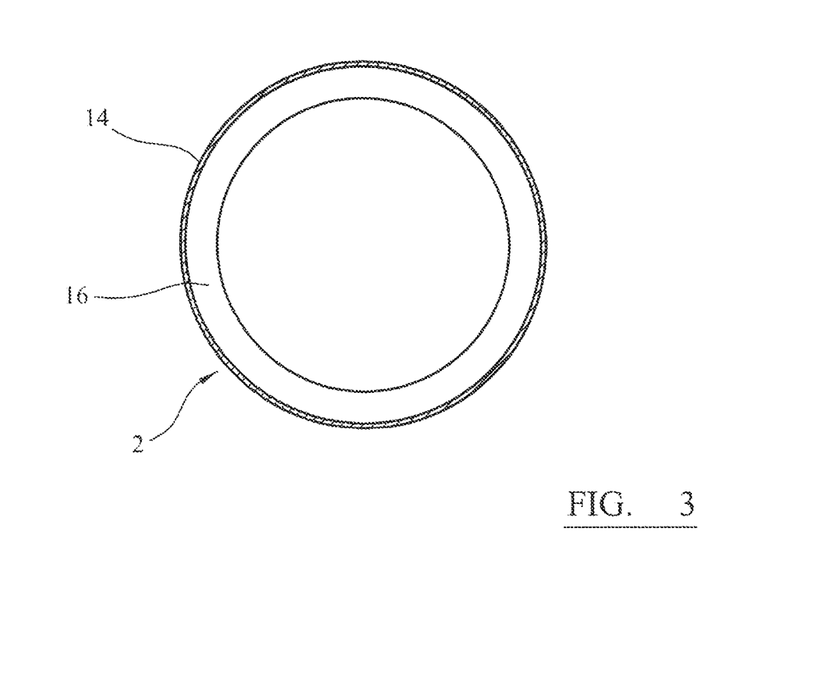
FIG. 3 is a cross-section through a PEEK pipe having an amorphous skin.

Whilst PEEK crystallises quickly, water quenching can result in rapid cooling such that the crystallisation process is inhibited. Thus, water quenching of the melted PEEK in the process results in the formation of a PEEK pipe as shown in FIG. 3 which has a skin 14 which is relatively amorphous and an inner region 16 which is relatively crystalline. FTIR may be used to assess crystallinity and this may be used to assess the level of crystallinity at a surface and/or across the thickness or surface of a sample. Reference is made to a paper titled "Crystallinity in Poly(Aryl-Ether-Ketone) Plaques Studied by Multiple Internal Reflection Spectroscopy" (Polymer Bull, 11, 433 (1984)). Typically, the amorphous skin is found to be 100-200 μm in depth and has a crystallinity of less than 15%. There is quite a sharp transition between the amorphous skin 14 and the interior 16. Typically, the latter has a crystallinity of 27% or greater.

As a result of the formation of the skin and the regions of different crystallinities, the PEEK pipe has high through-wall stress meaning that it would be susceptible to early failure, for example cracking, if it was subjected to high forces, for example as a result of bending or wide temperature fluctuations, in use. FIG. 4 shows the % crystallinity across the pipe and illustrates the significantly wide variation in crystallinity leading to stresses within the pipe wall. It will be noted that the highest crystallinity is seen in a region slightly outwardly of the inside surface. This is the region which cools slowest, during manufacture of the pipe. It will be appreciated that there will be some loss of heat from the inside surface itself and a slightly lower rate of loss of heat from the region adjacent the inside surface.

The reinforcing overwrap 4 is built up by winding the PEEK/fibre tape on the pipe 2 to define a hundred or more layers of tape. Since PEEK is a thermoplastic, with no significant tackiness to facilitate bonding of the PEEK in the tape to the PEEK in the pipe 2, the tape may be applied under tension and the tension maintained until heat is applied to melt the tape and consolidate it and hold it in place. Alternatively, and preferably, the tape may be heated and consolidated as it comes into contact with the PEEK of the pipe 2. Such localised heating of the tape as it meets the pipe 2 may be achieved using a heat source such as infra-red, laser, gas flame, hot air or hot gas. The tape is then consolidated by using a following roller.

As a result of the heat applied to the tape, the PEEK in it melts and, additionally, the surface of the pipe 2 may be melted and will subsequently re-solidify. Since the surface 14 of pipe 2 is amorphous, the application of the heat causes re-crystallisation. As a result, the crystallinity of the skin 14 is increased to a similar level to that of the interior adjacent thereto, so that there is no longer a defined skin but rather a substantially constant crystallinity from the outside wall of pipe 2 to the inside wall of the pipe 2. As a result, stress within the pipe 2 is substantially removed, after the tape has been applied.

Figure 5:
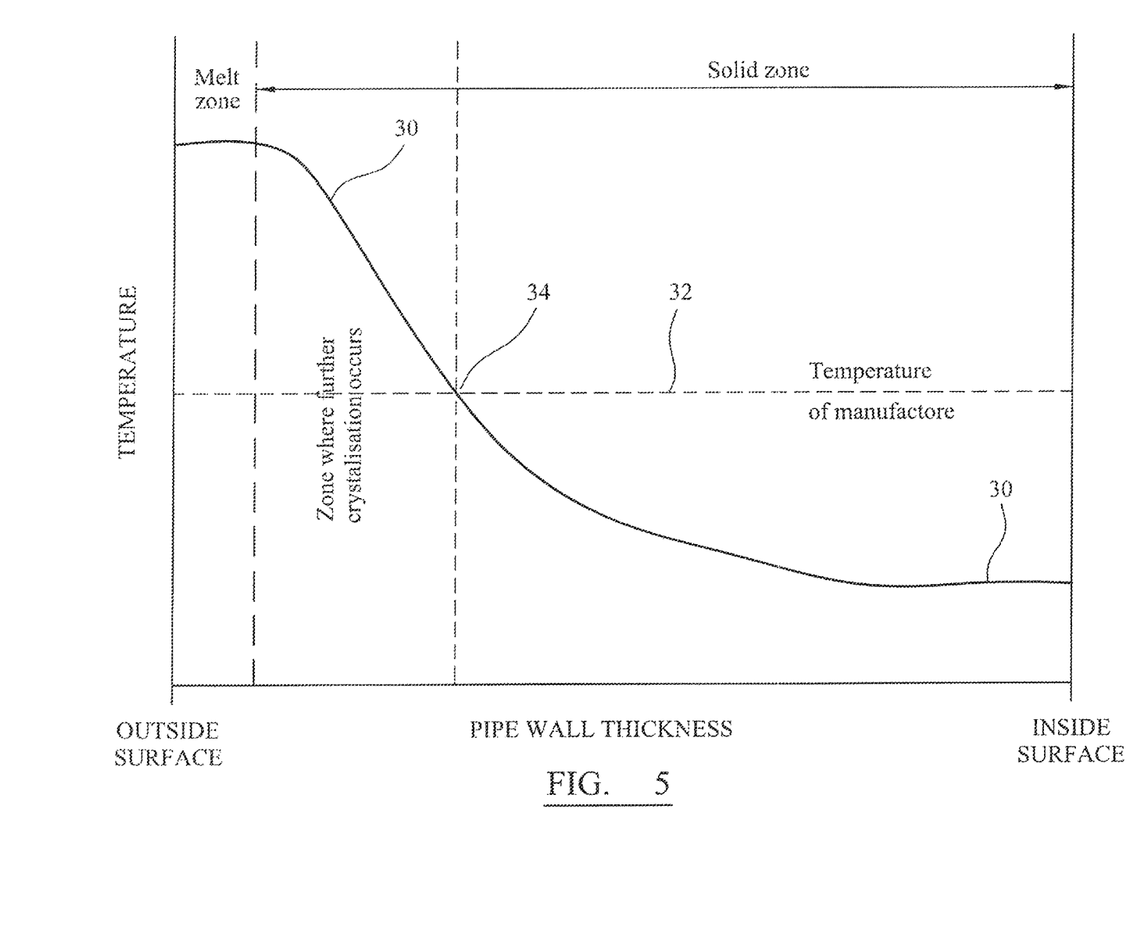
FIG. 5 is a schematic representation of the through wall temperature distribution of the PEEK pipe during bonding of a carbon fibre/PEEK composite reinforcing tape to the PEEK.

FIG. 5 includes a representation of the temperature distribution during bonding of the tape to the PEEK pipe. The figure represents temperature of the pipe 2 on the y axis and the pipe wall thickness on the x axis, with the outside surface of the pipe being represented at the left hand side of the x axis and the inside surface being represented at the right hand side of the x axis. During the process of welding the tape to the pipe 2, the surface of pipe 2 will melt in a zone defined as the melt zone in FIG. 5. It will subsequently slowly re-recrystallize as it solidifies since it is cooled relatively slowly due to it being subjected to ambient conditions and being insulated by the tape. Thus, its crystallinity will rise towards a typical level for a pipe made from PEEK. The temperature profile across the wall of pipe 2 during application of the tape is illustrated by line 30 in FIG. 5. As will be appreciated, the inside surface of the pipe wall is not significantly heated during application of the tape. Inwards of the melt zone, there is a further zone where further re-crystallisation occurs. This zone is defined by the intersection (at point 34) of the temperature profile line 30 and a "temperature of manufacture" line 32. The latter refers to the maximum temperature to which pipe 2 is subjected during its cooling in the apparatus of FIG. 2. It is understood that, in general, re-crystallisation of pipe 2 will only occur in regions which are subjected to a temperature during application of the tape which is higher than the temperature to which the regions were subjected during their manufacture in the cooling apparatus of FIG. 2. As a result of the re-crystallisation, the amorphous skin 14 of the pipe becomes crystalline (e.g. having a crystallinity of more than 25% and the crystallinity across the wall of pipe 2 becomes substantially constant.

After application of overwrap 4, the protective sheaf 5 may be applied in an extrusion process.

The composite pipe may be produced in very long lengths for example of 1000 m or more. It is preferably arranged to be spooled on a reel and, therefore, must be sufficiently flexible. The reduction of stresses within pipe 2 by use of the process described makes the pipe 2 less susceptible to failure and therefore advantageously extends its useful lifetime.

The composite pipe is preferably a flexible riser arranged to transport fluids between floating production units and a sub-sea wellhead.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A composite reinforced pipe comprising:
an extruded pipe P1 comprising a first polymeric material, said first polymeric material having a Tg ranging from 120° C. to less than 260° C., and said first polymeric material comprising the repeat units of the formula (XX):

wherein t1 and w1 independently represent 0 or 1 and v1 represents 0, 1 or 2;
a reinforcing means overlaying said pipe P1, said reinforcing means comprising:
a fibrous material; and
a second polymeric material comprising the repeat units of the formula (XX):

wherein t1 and w1 independently represent 0 or 1 and v1 represents 0, 1 or 2;
said pipe P1 further comprising an annular wall, said annular wall comprising an inside surface of the pipe P1, and an outer surface of the pipe P1;
wherein said reinforcing means is applied to the outer surface of the pipe P1 to form a composite reinforced pipe;
wherein the first polymeric material comprises a crystallinity ranging of at least 25% in an outer region of the pipe P1; and
wherein the second polymeric material of the reinforcing means bonds with the surface first polymeric material at the outer region of the pipe P1 to form the composite reinforced pipe.

2. The composite reinforced pipe according to claim 1, wherein said reinforcing means comprises 25-75 wt % of said fibrous material and 25-75 wt % of said second polymeric material.

3. The composite reinforced pipe according to claim 1, wherein the pipe P1 comprises a substantially constant crystallinity from the outside surface of the annular wall of pipe P1 to an inside surface of the annular wall of pipe P1.

4. The composite reinforced pipe according to claim 1, wherein the outside surface of the annular wall of pipe P1 does not comprise a defined skin.

5. The composite reinforced pipe according to claim 1, wherein the first polymeric material is polyether ether ketone.

6. The composite reinforced pipe according to claim 1, wherein the second polymeric material is polyether ether ketone.

7. The composite reinforced pipe according to claim 1, wherein the first polymeric material has a main peak melting endotherm of at least 300° C.

8. The composite reinforced pipe according to claim 1, wherein the pipe P1 remains chemically inert in the presence of a fluid at a temperature between 100° C. and 200° C.

9. The composite reinforced pipe according to claim 1, wherein the annular wall thickness of pipe P1 ranges from 0.5 to 30 mm.

10. The composite reinforced pipe according to claim 1, wherein the thickness of the reinforcing means overlaying pipe P1 ranges from 0.25 mm to 80 mm.

11. The composite reinforced pipe according to claim 1, wherein said composite reinforced pipe comprises an outside diameter ranging from 5 cm to less than 100 cm.

12. The composite reinforced pipe according to claim 1, wherein said pipe P1 comprises a wall thickness ranging from 1 mm to less than 10 mm.

13. The composite reinforced pipe according to claim 1, wherein said pipe P1 comprises an outside diameter ranging from 2.5 cm to less than 40 cm.

14. The composite reinforced pipe according to claim 1, wherein said composite reinforced pipe has a length of at least 100 m.

* * * * *